(12) United States Patent
Jamieson et al.

(10) Patent No.: US 7,753,396 B2
(45) Date of Patent: Jul. 13, 2010

(54) AUTOMOTIVE VEHICLE TOW HOOKS

(75) Inventors: Stuart Jamieson, Chelsea, MI (US); Freeman Thomas, Laguna Beach, CA (US); David Woodhouse, Newport Coast, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 11/972,704

(22) Filed: Jan. 11, 2008

(65) Prior Publication Data
US 2009/0179401 A1   Jul. 16, 2009

(51) Int. Cl.
*B60D 1/00* (2006.01)
(52) U.S. Cl. .................................................. 280/498
(58) Field of Classification Search .................. 280/498, 280/495, 491.5, 504; 180/309; D12/194, D12/167, 196
See application file for complete search history.

(56) References Cited

U.S. PATENT DOCUMENTS

| | | | | |
|---|---|---|---|---|
| 2,992,035 | A * | 7/1961 | Tell et al. | 293/113 |
| D435,815 | S * | 1/2001 | Larson | D12/169 |
| D474,726 | S * | 5/2003 | Weber et al. | D12/196 |
| 6,827,173 | B2 * | 12/2004 | Lai | 180/309 |
| 6,920,183 | B2 * | 7/2005 | Casper | 375/257 |
| 6,962,230 | B2 * | 11/2005 | Hanaya et al. | 180/309 |
| 6,986,281 | B1 * | 1/2006 | Hubbell et al. | 73/152.01 |
| D529,419 | S | 10/2006 | Richards et al. | |
| 7,234,672 | B1 * | 6/2007 | Osterholt et al. | 248/304 |
| D549,629 | S * | 8/2007 | Davidson | D12/194 |
| D559,742 | S | 1/2008 | Thomas et al. | |
| D561,646 | S | 2/2008 | Thomas et al. | |
| D561,658 | S | 2/2008 | Thomas et al. | |
| D563,277 | S | 3/2008 | Thomas et al. | |
| D563,302 | S * | 3/2008 | Medema et al. | D12/194 |
| 2002/0093167 | A1 * | 7/2002 | Jones et al. | 280/87.042 |
| 2004/0090041 | A1 * | 5/2004 | Lenzen et al. | 280/491.5 |
| 2009/0108566 | A1 * | 4/2009 | Asjad | 280/498 |

OTHER PUBLICATIONS

Roth, Dan; "Detroit Auto Show: Ford Airstream Concept"; Autoblog website article, located at www.autoblog. com/2007/01/07/detroit-auto-show-ford-airstream-concept/; 16 pages; Jan. 7, 2007.

(Continued)

*Primary Examiner*—Tony H. Winner
(74) *Attorney, Agent, or Firm*—Frank A. MacKenzie; Brooks Kushman P.C.

(57) ABSTRACT

An automotive vehicle is provided with a vehicle body and at least one tow hook. The vehicle body has a front end and a rear end. The at least one tow hook is pivotally connected to the front end of the vehicle body and may pivot between a stored position at least partially recessed within the vehicle body and a deployed position extending beyond the vehicle body to facilitate access to the at least one tow hook. The vehicle may further have an actuator to cooperate with the at least one tow hook to pivot the at least one tow hook relative to the vehicle body. The vehicle may further have a pair of tow hooks on the front end and a pair of exhaust members mounted within a pair of exhaust apertures formed in the rear end.

20 Claims, 9 Drawing Sheets

OTHER PUBLICATIONS

Thomas, David; "2006 L.A. Auto Show: Ford Explorer Fuel Cell"; Cars.com Kicking Tires article, located at http:// blogs.cars.com/kickingtires/2006/11/2006_la_auto_sh_4.html; 3 pages; Nov. 28, 2006.

"Ford F-250 Super Chief Concept: A Bold, American Flex Fuel Pickup That Delivers Tomorrow's Fuel Today"; Ford Motor Company Press Release, located at http://media.ford.com/newsroom/release_display.cfm?release=22295; 5 pages; Jan. 8, 2006.

Pund, Daniel, "The Bold and the Brutiful: Ford designs another rear-drive sport sedan concept," Edmunds website article, located at http://www.edmunds.com/insideline/do/Features/articleId=118988; 2 pages; Dec. 30, 2006.

"2008 Explorer Maintains Leadership Among Midsize SUVs With Unmatched Features and Equipment", Ford press release posted on Zer Customs website, located at http://www.zercustoms.com/news/2008-ford-explorer.html; 3 pages; Jul. 11, 2007.

\* cited by examiner

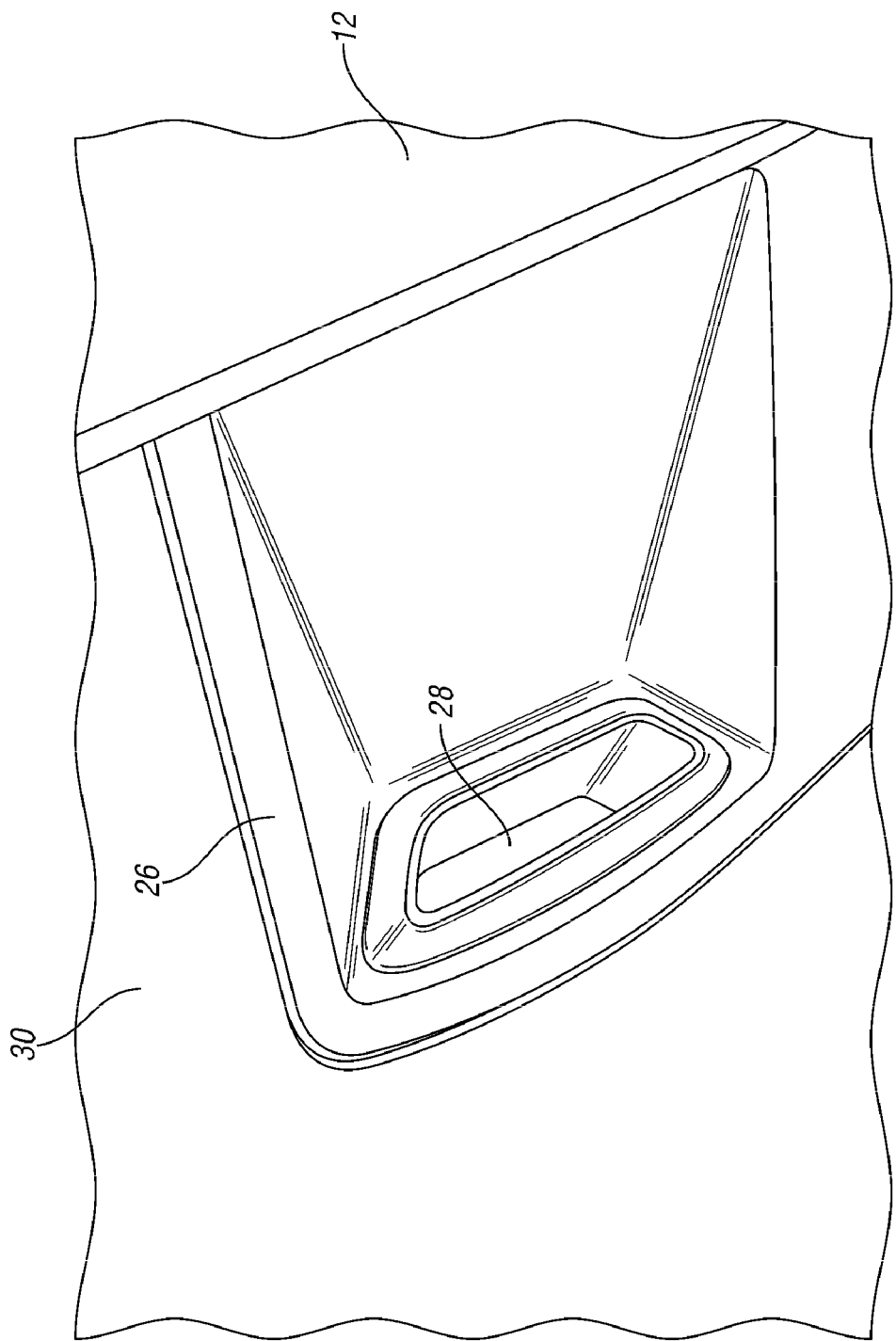

AUTOMOTIVE VEHICLE TOW HOOKS

BACKGROUND OF THE INVENTION

1. Field of the Invention

The invention relates to tow hooks for automotive vehicles.

2. Background Art

Tow hooks are often employed on an automotive vehicle to allow a user to attach an article utilizing a tow strap or a chain. Typically, the tow hook is provided on a front end of the vehicle so that the user can tow the object when the vehicle is driven in a rearward direction. After the user attaches the article to the vehicle, the user may then tow the object by driving the vehicle in the proper direction. The tow hooks are generally adequately mounted on the vehicle to withstand force exerted by the object as the user tows the object.

A pair of symmetrically oriented tow hooks are often provided on the vehicle so that force from the object is distributed.

Tow hooks are generally provided on larger vehicles that have substantial towing capacity, such as sport utility vehicles (SUVs), trucks, vans, minivans, and crossover vehicles. Utilization of tow hooks on a larger vehicle allows the user to tow an object having a greater weight. For example, SUVs with tow hooks allow the user to attach a second vehicle thereto in order to pull the second vehicle out of mud or snow.

SUMMARY OF THE INVENTION

In one embodiment, an automotive vehicle is provided. The vehicle has a vehicle body and at least one tow hook. The vehicle body has a front end and a rear end. The at least one tow hook is pivotally connected to the front end of the vehicle body to pivot between a stored position at least partially recessed within the vehicle body and a deployed position extending beyond the vehicle body to facilitate access to the at least one tow hook.

In a further embodiment, the automotive vehicle has at least one exhaust member mounted within at least one exhaust aperture formed in the rear end of the vehicle body. The at least one tow hook in the stored position and the at least one exhaust member are generally equally recessed within the vehicle body to limit foreign objects from contacting the at least one tow hook or from entering the at least one exhaust member.

An even further embodiment provides that the at least one tow hook in the stored position and the at least one exhaust member are laterally oriented to limit foreign objects from contacting the at least one tow hook or from entering the at least one exhaust member.

In another even further embodiment, the at least one tow hook and the at least one exhaust member are oriented at a generally equal height on the vehicle body.

In yet another even further embodiment, the at least one tow hook and the at least one exhaust member each have a generally polygonal shape.

Another further embodiment discloses that the at least one tow hook is connected to a lower portion of the front end of the vehicle body.

In another further embodiment, the automotive vehicle has a skid plate provided on a lower portion of the vehicle body and the at least one tow hook extends therethrough.

In still another further embodiment, the at least one tow hook pivots in a lateral direction.

Another further embodiment provides that the at least one tow hook has an aperture formed therethrough adapted to receive a connecting member therethrough.

Yet another further embodiment discloses that the at least one tow hook further comprises a pair of tow hooks spaced laterally apart.

In another further embodiment, the at least one tow hook has a generally polygonal shape.

Another further embodiment further provides at least one actuator cooperating with the at least one tow hook to pivot the at least one tow hook relative to the vehicle body.

In another embodiment, an automotive vehicle is provided with a vehicle body, at least one tow hook and an actuator. The vehicle body has a front end and a rear end. The at least one tow hook is pivotally connected to the front end of the vehicle body. The actuator cooperates with the at least one tow hook to pivot the at least one tow hook relative to the vehicle body.

In a further embodiment, the at least one tow hook pivots between a stored position at least partially recessed within the vehicle body and a deployed position extending beyond the vehicle body to facilitate access to the at least one tow hook.

In another further embodiment, the automotive vehicle has a skid plate provided on a lower portion of the vehicle body and the at least one tow hook extends therethrough.

Yet another embodiment provides an automotive vehicle with a vehicle body, a pair of tow hooks and a pair of exhaust members. The vehicle body has a front end and a rear end. The pair of tow hooks are pivotally connected to the front end of the vehicle body and spaced laterally apart. The pair of exhaust members are mounted within a pair of exhaust apertures formed in the rear end of the vehicle body. The pair of tow hooks and the pair of exhaust members are generally equally recessed within the vehicle body to limit foreign objects from contacting the pair of tow hooks or from entering the pair of exhaust members. The pair of tow hooks in the stored position and the pair of exhaust members are laterally oriented to limit foreign objects from contacting the pair of tow hooks or from entering the pair of exhaust members.

In a further embodiment, the automotive vehicle further discloses a front skid plate provided on a lower portion of the vehicle body and the pair of tow hooks extend therethrough.

Still another further embodiment discloses a rear skid plate provided on a lower portion of the vehicle body such that the pair of exhaust members extend therethrough.

In another further embodiment, a pair of actuators cooperate with the pair of tow hooks to pivot the at least one tow hook relative to the vehicle body.

In yet another further embodiment, the automotive vehicle further an actuator cooperating with each of the pair of tow hooks to pivot the pair of tow hooks relative to the vehicle body.

The above embodiments, and other embodiments, features, benefits and advantages of the present invention are readily apparent from the attached figures, and from the detailed description of embodiments of the invention set forth below.

BRIEF DESCRIPTION OF THE DRAWINGS

FIG. 9 is an enlarged perspective view of an exhaust pipe embodiment for the vehicle of FIG. 3.

DETAILED DESCRIPTION OF EMBODIMENTS OF THE INVENTION

Figure 1:
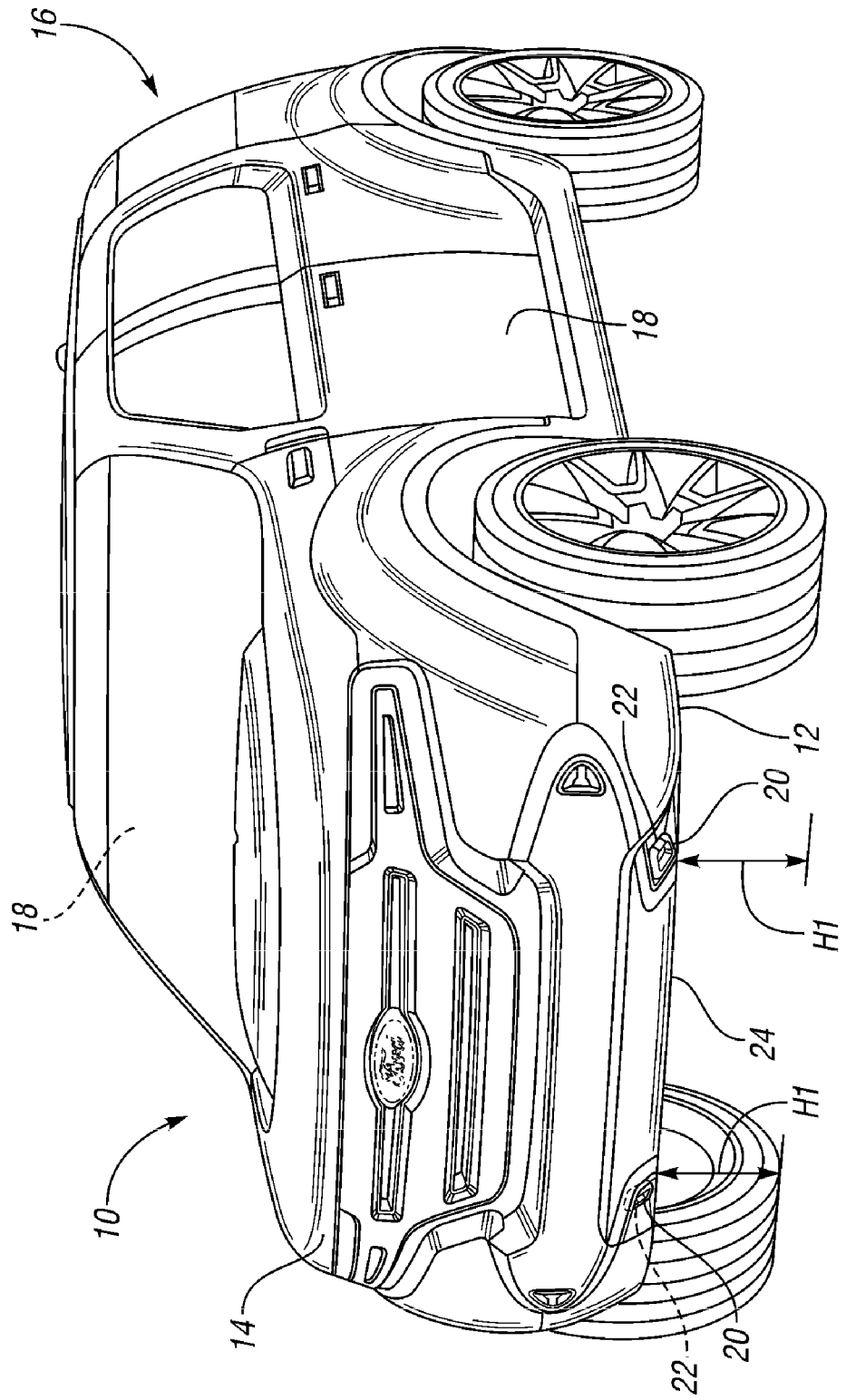
FIG. 1 is a front/side perspective view of an automotive vehicle illustrating tow hooks according to an embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Referring to FIGS. 1-4, an automotive vehicle is illustrated and is referenced generally by numeral 10. The vehicle 10 has a vehicle body 12, which provides the body structure for the vehicle 10. As illustrated, the vehicle body 12 forms an SUV. Of course, any suitable vehicle body 12 is contemplated within the scope of the present invention.

The vehicle body 12 has a front end 14 and a rear end 16. The front end 14 is toward the forward direction of travel of the vehicle 10 and the rear end 16 is toward the rearward direction of travel of the vehicle 10. Any size or shape for the front end 14 and the rear end 16 is contemplated within the scope of the present invention. Between the front end 14 and the rear end 16 are opposing lateral sides 18 of the vehicle body 12.

Figure 2:
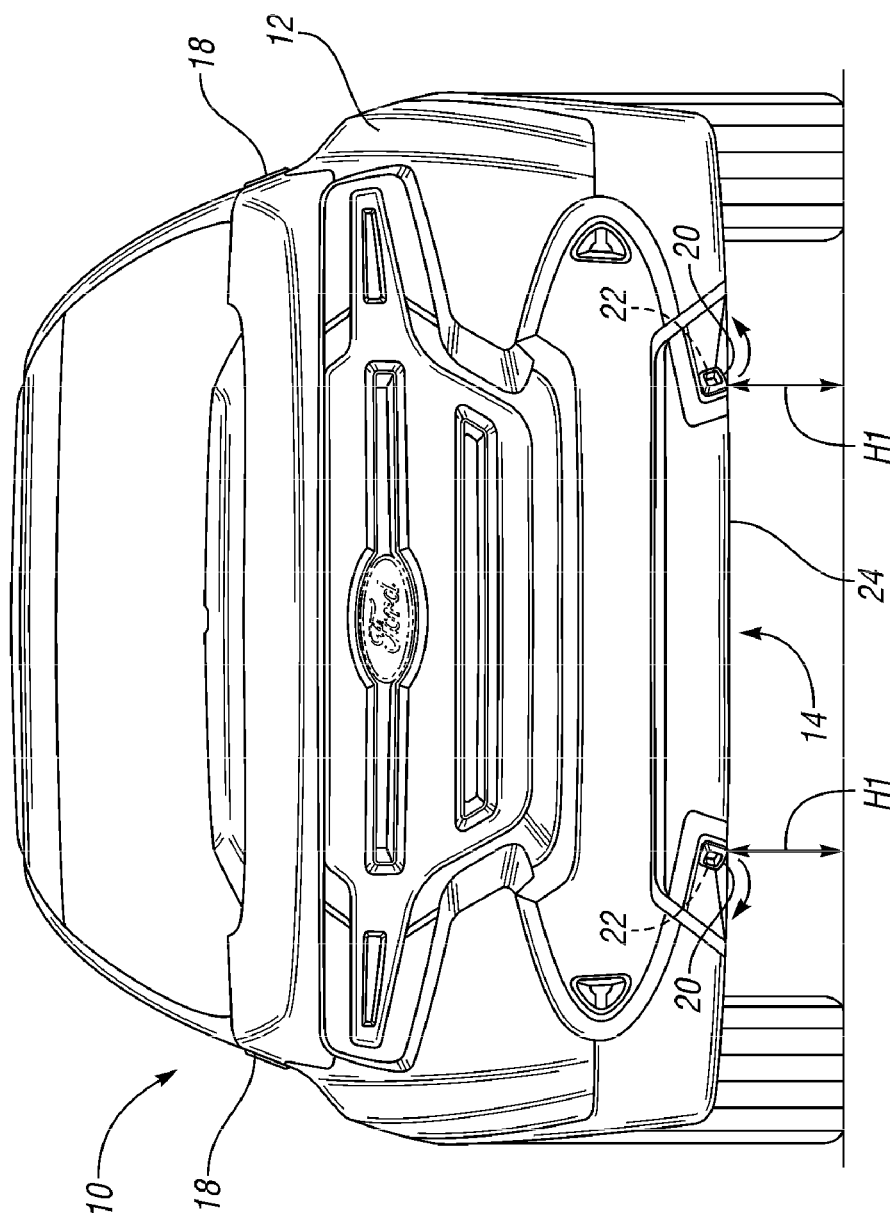
FIG. 2 is a front prospective view of another embodiment of the vehicle of FIG. 1.

With reference now to FIGS. 1 and 2, the front end 14 of the vehicle body 12 is illustrated in detail. The front end has tow hooks 20 mounted thereon. As illustrated, the tow hooks 20 are provided at an equal height H1 from an underlying support surface for the vehicle 10. The tow hooks 20 are oriented toward opposing lateral sides 18 of the vehicle body 12. Although two tow hooks 20 are illustrated, any number of tow hooks 20 having any suitable orientation are contemplated within the scope of the present invention.

Prior art tow hooks are generally provided on a front end of vehicle bodies, such as SUVs. Since SUVs are commonly employed for off-roading and tow hooks are generally provided on the fronts of SUVs, there is an increased risk that the tow hooks will hook onto branches or be damaged and/or broken by debris or foreign objects. Additionally, prior art tow hooks are often recessed within the fascia of the vehicle body without pivoting to a deployed position. When a tow strap or chain is attached to the tow hooks, there is an increased risk that the force of the tow strap or chain will cause wear and/or crack the fascia of the vehicle body. Furthermore, since numerous prior art tow hooks extend beyond the vehicle body, the tow hooks have even greater chances of being damaged and/or broken. To help minimize the risk of damage to the tow hooks 20 of the present invention, a stored position and a deployed position for the tow hooks 20 are provided.

Figure 5:
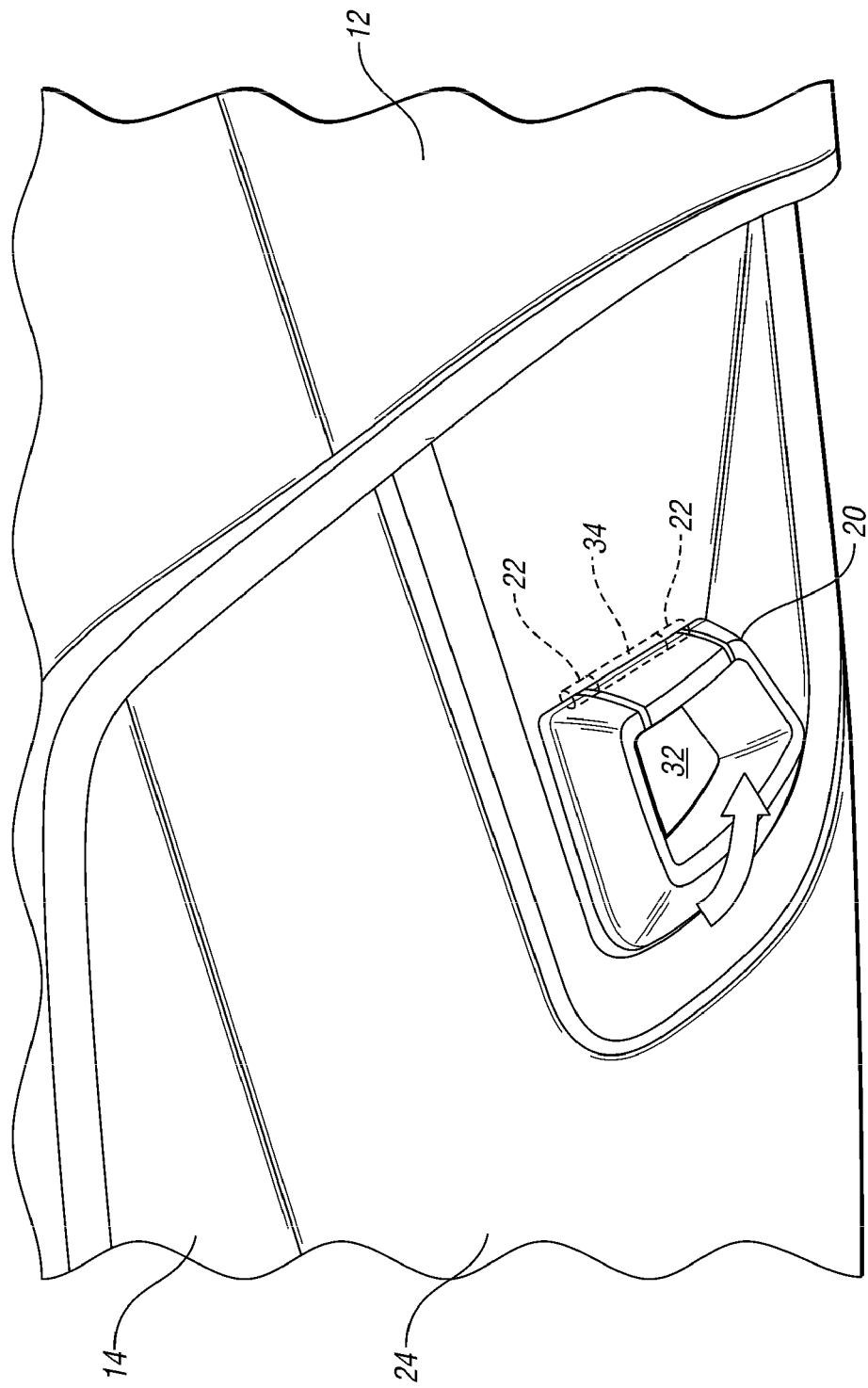
FIG. 5 is an enlarged perspective view of a tow hook embodiment in a stored position for the vehicle of FIG. 1.
Figure 6:
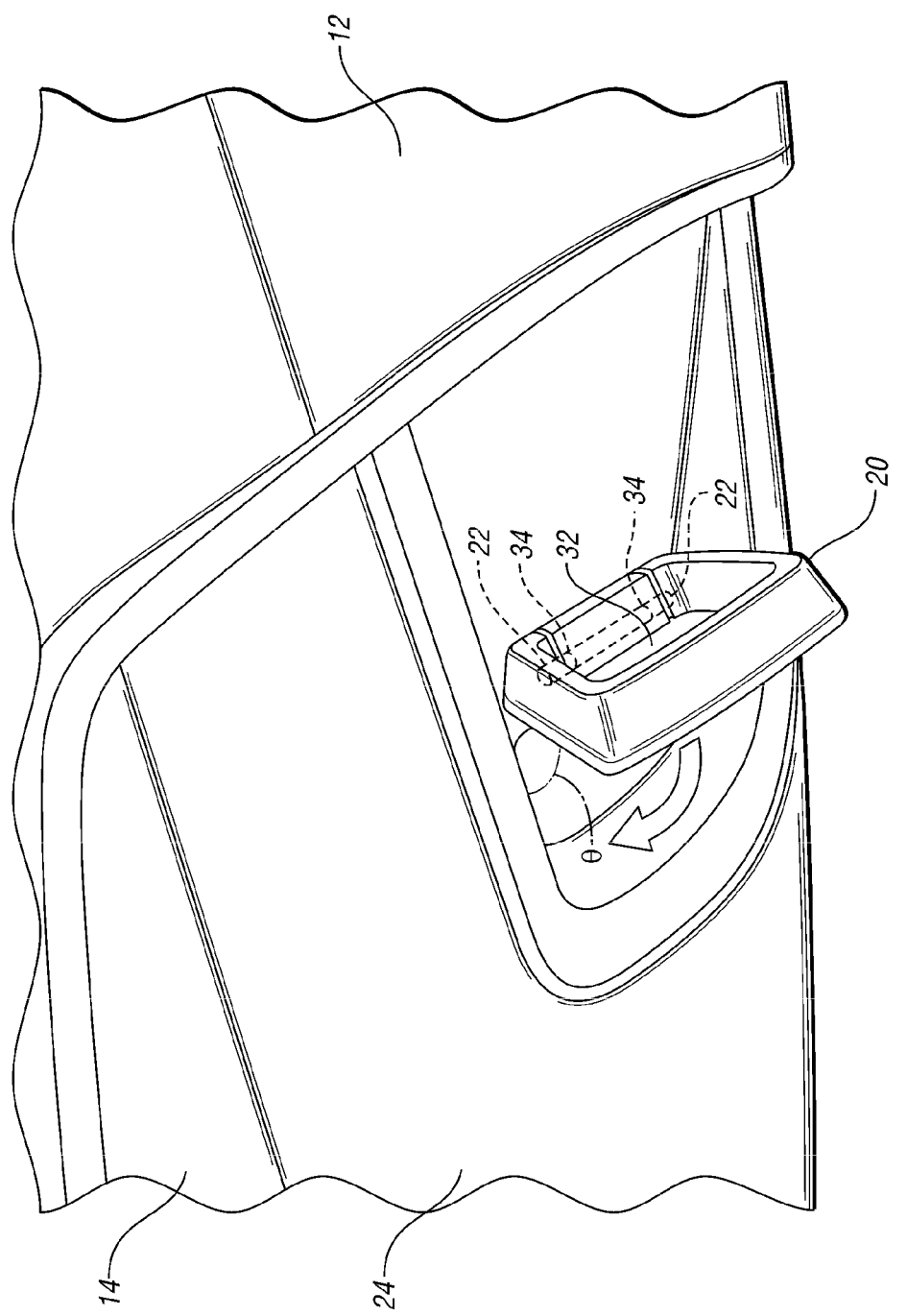
FIG. 6 is another perspective view of the tow hook in a deployed position of FIG. 5.
Figure 7:
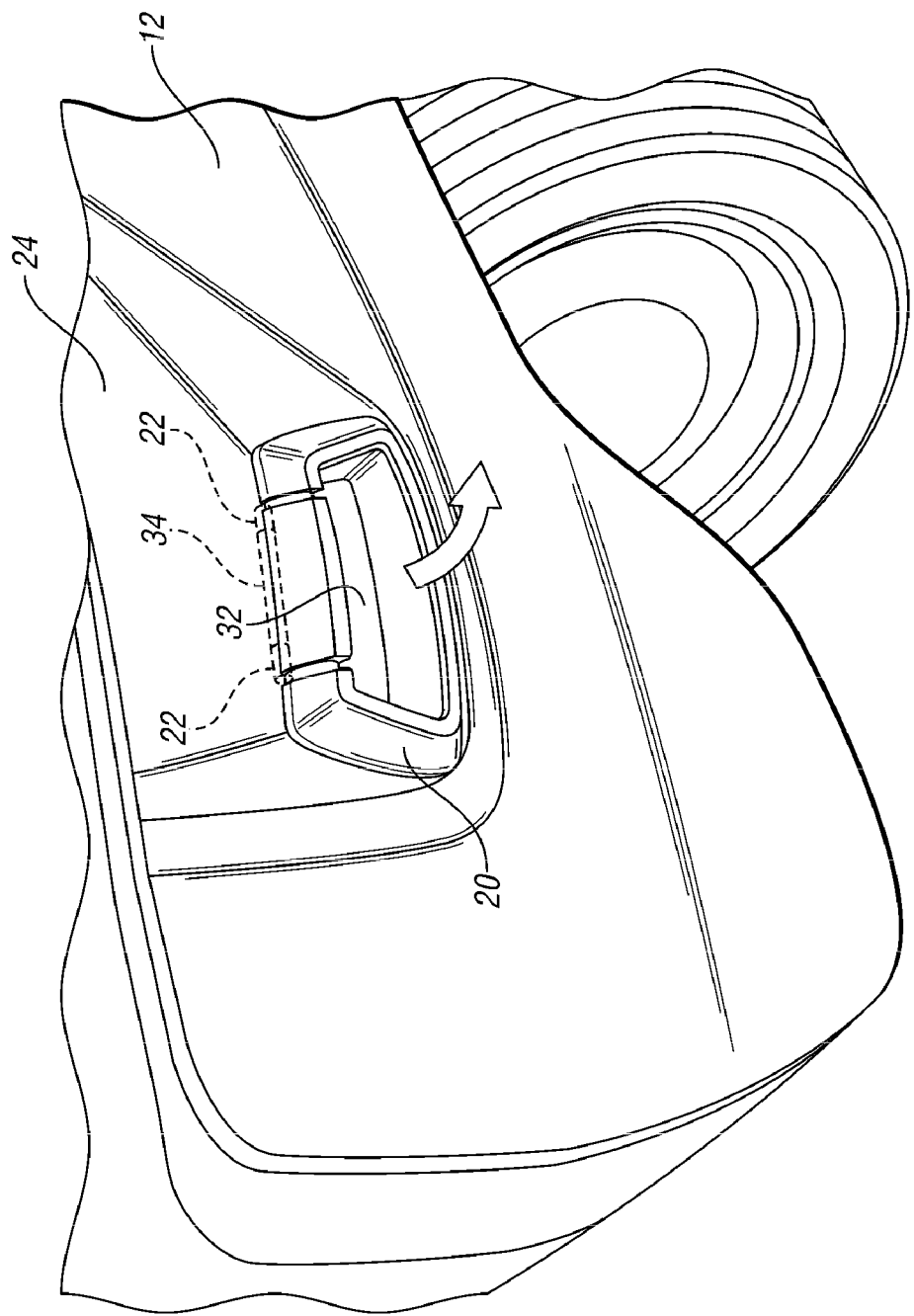
FIG. 7 is an enlarged perspective view of a tow hook embodiment in a stored position for the vehicle of FIG. 1.
Figure 8:
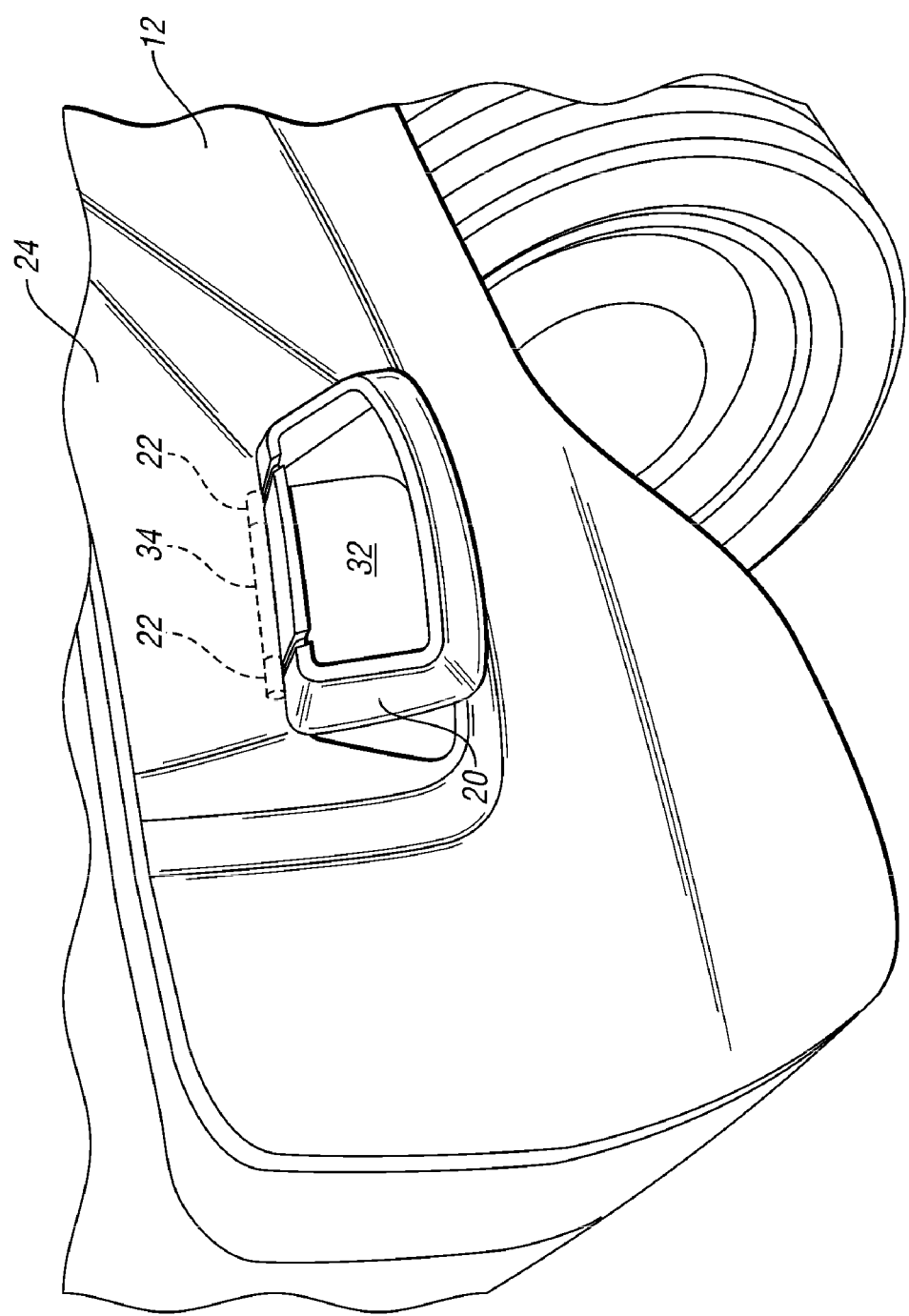
FIG. 8 is another perspective view of the tow hook of FIG. 7.

The tow hooks 20 are pivotally mounted to the vehicle body 12 to pivot between the stored position, as illustrated in FIGS. 5 and 7, and the deployed position, as illustrated in FIGS. 6 and 8. In one embodiment, the tow hooks 20 are mounted to the vehicle body 12 with one or more hinges 22. Although hinges are depicted, the tow hooks 20 can be pivotally mounted to the vehicle body 12 with any suitable pivotal connectors 22. Of course, the connection between the tow hooks 20 and the vehicle body 12 is sufficiently strong so that the vehicle 10 can tow a desired object that is connected to the vehicle 10 at the tow hooks 20.

As shown in FIGS. 1 and 2, the tow hooks 20 are in a stored position so that the tow hooks 20 generally do not extend beyond the front end 14 of the vehicle body 12. In the stored position, the tow hooks 20 are not readily accessible for a user and are compact to avoid contact with debris and foreign objects that the vehicle 10 may be run over while the user drives the vehicle or may contact in a parked position. In one embodiment, when tow hooks 20 are in the stored position, an outer surface of each of the tow hooks 20 is generally flush with the vehicle body 12. The generally flush position of the tow hooks 20 minimizes undesired contact from debris that can damage and/or break the tow hooks 20. In another embodiment, the tow hooks 20 in the stored position are recessed within the vehicle body 12 so that no portion of the tow hooks 20 extend beyond vehicle body 12 to further reduce the risk of damaging and/or breaking the tow hooks 20. In one embodiment, the tow hooks 20 are fully recessed while in the stored position. In another embodiment, the tow hooks 20 are partially recessed while in the stored position.

To protect the vehicle body 12 from contact with debris and foreign objects, which can damage the vehicle body 12, a front skid plate 24 may be mounted on the vehicle body 12. In the illustrated embodiment, the front skid plate 24 is on a lower portion of the front end 14 to protect the vehicle body 12 from being damaged by any debris that may contact the front end 14. The front skid plate 24 can be mounted to the vehicle body 12 in any suitable manner.

In the illustrated embodiment, the tow hooks 20 are mounted to the front end 14 and extend through the front skid plate 24. Since the tow hooks 20 are mounted to the vehicle body 12 on the front skid plate 24, the tow hooks 20, in the stored position illustrated, are recessed within the vehicle body 12 to protect the tow hooks 20 from being struck by a foreign object that may damage or break the tow hooks 20. Since the tow hooks 20 are recessed within the vehicle body 12, the tow hooks 20 are pivotally connected to the vehicle body 12 to allow the tow hooks 20 to become readily accessible as desired by the user.

An embodiment of one tow hook 20 of the tow hooks 20 is further illustrated in FIGS. 5-8. In one embodiment, the tow hook 20 has a polygonal shape with an aperture 32 formed therethough. The polygonal shape along with the aperture 32 collectively allow the user to wrap a desired tow strap or chain around the tow hook 20 in order to connect an object to the tow hook 20 when the tow hook 20 is in the deployed position, illustrated in FIGS. 6 and 8.

In one embodiment, the tow hook 20 pivots from the stored position to the deployed position when actuated by an actuator 34 to pivot a specified amount. Once the tow hook 20 pivots the specified amount from the stored position to the deployed position, the tow hook 20 may be locked in the deployed position until the actuator 34 actuates the tow hook 20 to pivot from the deployed position to the stored position. Any suitable actuator is contemplated within the scope of the present invention, such as a DC electric motor 34.

In FIGS. 5 and 7, the tow hook 20 is shown in the stored position, recessed within the front skid plate 24 of the vehicle body 12. The tow hook 20 then pivots in the direction indicated by the arcuate arrows toward the deployed position, illustrated in FIGS. 6 and 8. In FIGS. 6 and 8, the tow hook 20 has pivoted from the vehicle body 12 to a desired angle $\Theta$. The desired angle $\Theta$ can be any angle between zero degrees and one hundred-eighty degrees. Once the user is finished with the tow hook 20, the tow hook 20 pivots in the direction indicated by the arcuate arrows to return to the stored position. In one embodiment, the actuator 34 actuates the tow hook 20 to pivot to the desired angle Θ and can actuate the tow hook 20 to pivot back from the desired angle Θ to the stored position.

Figure 3:
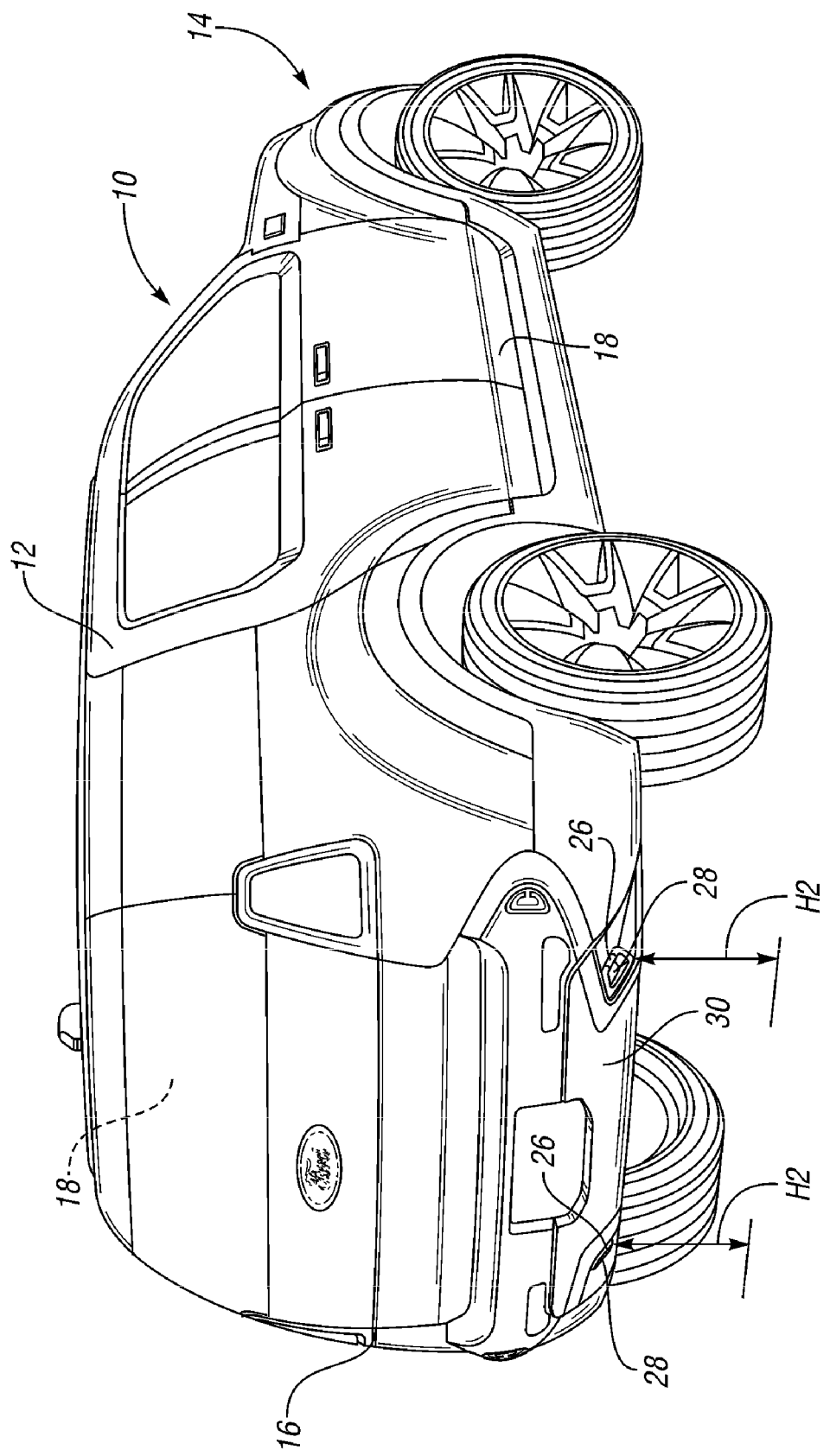
FIG. 3 is a rear/side perspective view of an embodiment of the vehicle of FIG. 1 illustrating exhaust pipes.
Figure 4:
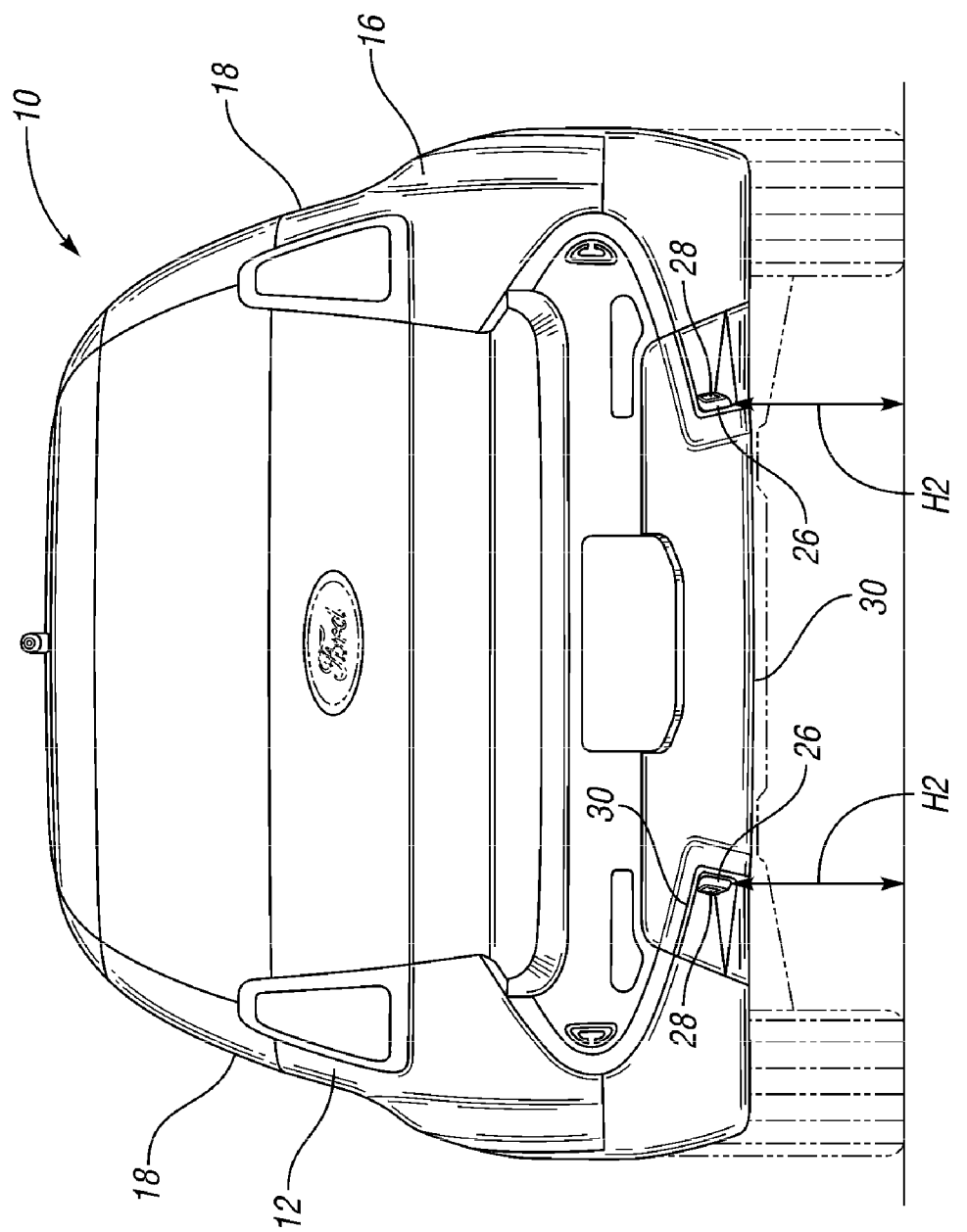
FIG. 4 is a rear perspective view of the vehicle of FIG. 3.

Referring now to FIGS. 3 and 4, the rear end 16 of the vehicle body 12 is illustrated in detail. The rear end 16 has exhaust pipes 26 mounted therein. The exhaust pipes 26 are provided to route engine exhaust fumes out of the vehicle 10. The exhaust pipes 26 each have corresponding exhaust apertures 28 provided therethrough to allow the engine exhaust fumes to exit from the exhaust pipes 26. Dual exhaust pipes 26 are depicted but a single exhaust pipe 26 or other multiple number of exhaust pipes 26 may be utilized within the scope of the present invention.

The rear end 16 has a rear skid plate 30 mounted thereon to protect the vehicle body 12, as the front skid plate 24 protects the vehicle body 12, which is described above. In one embodiment, the rear skid plate 16 has a shape similar to a shape of the front skid plate 14 so that both the front skid plate 14 and the rear skid plate 16 provide adequate protection of the vehicle body 12.

One exhaust pipe 26 is depicted in greater detail in FIG. 9. The exhaust pipe 26 is shown recessed within the rear skid plate 30, which is mounted on the vehicle body 12. The exhaust pipe 26 can be fully or partially recessed. The exhaust pipe 26 is recessed within the rear skid plate 30 so that debris and foreign objects do not contact and/or enter the exhaust pipe 26, which may damage and/or break the exhaust pipe 26. In one embodiment, the exhaust pipes 26 are recessed within the rear side plate 30 generally the same amount that the tow hooks 20 are recessed within the front skid plate 24 so that the exhaust pipes 26 and the side plates 20 are equally protected from foreign objects.

As shown in FIGS. 3-4, the exhaust pipes 26 are provided at respective opposing lateral side 18 of the vehicle body 12. In one embodiment, each of the exhaust pipes 26 are provided at an equal height H2 from the underlying support surface for the vehicle 10. In another embodiment, the exhaust pipes 26 are oriented toward opposing lateral sides 18 of the vehicle body 12.

As illustrated, the tow hooks 20 and the exhaust pipes 26 use common design cues. In one embodiment, the tow hooks 20 and the exhaust pipes 26 have common design cutes since the height H2 of the exhaust pipes 26 is equal to the height H1 of the tow hooks 20, while the tow hooks 20 and the exhaust pipes 26 each face respective opposing lateral sides 18 of the vehicle body. The heights H1, H2 and orientation of the tow hooks 20 and the exhaust pipes 26 provide a similar appearance for the front skid plate 24 with two tow hooks 20 and the rear skid plate 30 with two exhaust pipes 26 while also allowing the tow hooks 20 and exhaust pipes 26 to be protected from being damaged and/or broken by foreign objects.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An automotive vehicle comprising:
    a vehicle body having front and rear ends; and
    at least one tow hook pivotally connected to the front end of the vehicle body to pivot between a stored position at least partially recessed within the vehicle body and a deployed position extending beyond the vehicle body to facilitate access to the at least one tow hook;
    wherein the at least one tow hook pivots in a lateral direction.

2. The automotive vehicle of claim 1 further comprising at least one exhaust member mounted within at least one exhaust aperture formed in the rear end of the vehicle body;
    wherein the at least one tow hook in the stored position and the at least one exhaust member are generally equally recessed within the vehicle body to limit foreign objects from contacting the at least one tow hook or from entering the at least one exhaust member.

3. The automotive vehicle of claim 2 wherein the at least one tow hook in the stored position and the at least one exhaust member are laterally oriented to limit foreign objects from contacting the at least one tow hook or from entering the at least one exhaust member.

4. The automotive vehicle of claim 2 wherein the at least one tow hook and the at least one exhaust member are oriented at a generally equal height on the vehicle body.

5. The automotive vehicle of claim 2 wherein the at least one tow hook and the at least one exhaust member each have a generally polygonal shape.

6. The automotive vehicle of claim 1 wherein the at least one tow hook is connected to a lower portion of the front end of the vehicle body.

7. The automotive vehicle of claim 1 further comprising a skid plate provided on a lower portion of the vehicle body such that the at least one tow hook extends therethrough.

8. The automotive vehicle of claim 1 wherein the at least one tow hook has an aperture formed therethrough adapted to receive a connecting member therethrough.

9. The automotive vehicle of claim 1 wherein the at least one tow hook further comprises a pair of tow hooks spaced laterally apart.

10. The automotive vehicle of claim 1 wherein the at least one tow hook has a generally polygonal shape.

11. The automotive vehicle of claim 1 further comprising at least one actuator cooperating with the at least one tow hook to pivot the at least one tow hook relative to the vehicle body.

12. An automotive vehicle comprising:
    a vehicle body having a front end and a rear end;
    a pair of tow hooks pivotally connected to the front end of the vehicle body and spaced laterally apart; and
    a pair of exhaust members mounted within a pair of exhaust apertures formed in the rear end of the vehicle body;
    wherein the pair of tow hooks and the pair of exhaust members are generally equally recessed within the vehicle body to limit foreign objects from contacting the pair of tow hooks or from entering the pair of exhaust members; and
    wherein the pair of tow hooks in the stored position and the pair of exhaust members are laterally oriented to limit foreign objects from contacting the pair of tow hooks or from entering the pair of exhaust members.

13. The automotive vehicle of claim 12 further comprising a front skid plate provided on a lower portion of the vehicle body such that the pair of tow hooks extend therethrough.

14. The automotive vehicle of claim 12 further comprising a rear skid plate provided on a lower portion of the vehicle body such that the pair of exhaust members extend therethrough.

15. The automotive vehicle of claim 12 further an actuator cooperating with each of the pair of tow hooks to pivot the at least one tow hook relative to the vehicle body.

16. The automotive vehicle of claim 12 further comprising a pair of actuators cooperating with the pair of tow hooks to pivot the pair of tow hooks relative to the vehicle body.

17. An automotive vehicle comprising:
   a vehicle body having a front end and a rear end;
   at least one tow hook pivotally connected to the front end of the vehicle body to pivot between a stored position at least partially recessed within the vehicle body and a deployed position extending beyond the vehicle body to facilitate access to the at least one tow hook; and
   at least one exhaust member mounted within at least one exhaust aperture formed in the rear end of the vehicle body;
   wherein the at least one tow hook in the stored position and the at least one exhaust member are generally equally recessed within the vehicle body to limit foreign objects from contacting the at least one tow hook or from entering the at least one exhaust member; and
   wherein the at least one tow hook in the stored position and the at least one exhaust member are laterally oriented to limit foreign objects from contacting the at least one tow hook or from entering the at least one exhaust member.

18. The automotive vehicle of claim 17 further comprising at least one actuator cooperating with the at least one tow hook to pivot the at least one tow hook.

19. The automotive vehicle of claim 17 further comprising a skid plate provided on the vehicle body and the at least one tow hook extends therethrough.

20. The automotive vehicle of claim 17 wherein at least one of the at least one tow hook and the at least one exhaust member has a generally polygonal shape.

* * * * *